Nov. 13, 1945.  J. H. BOOTH  2,388,950
ROLLER BEARING JOINT ASSEMBLY
Filed Aug. 31, 1944
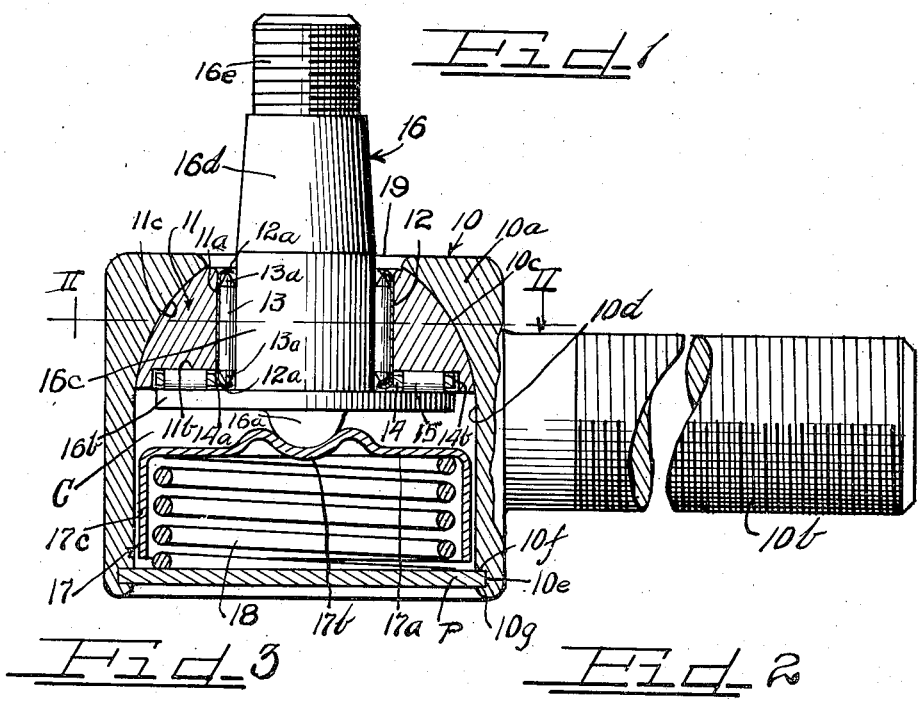
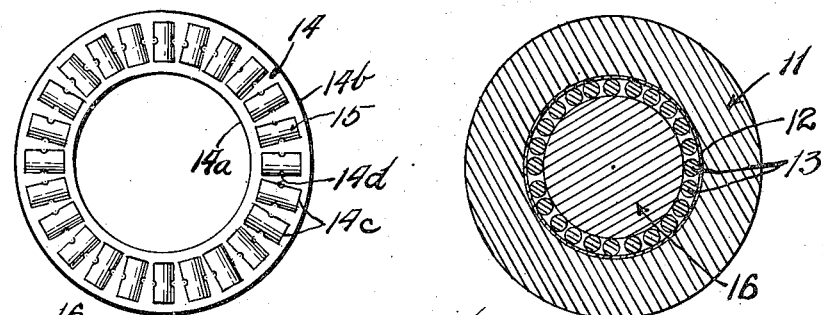
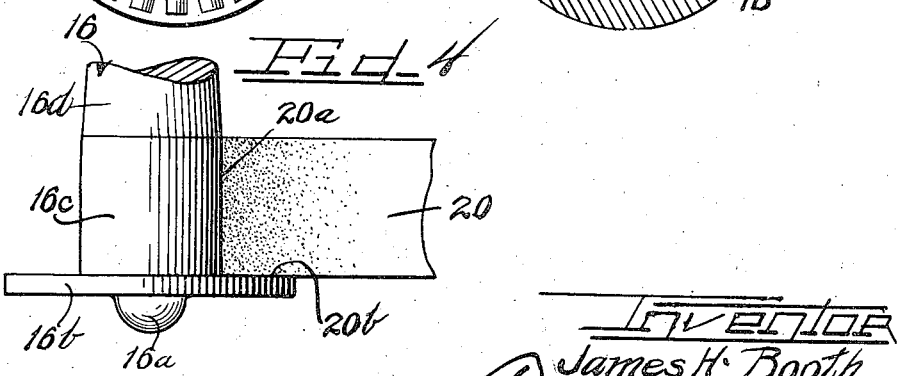
Inventor
James H. Booth Patented Nov. 13, 1945

2,388,950

UNITED STATES PATENT OFFICE 2,388,950

ROLLER-BEARING JOINT ASSEMBLY

James H. Booth, Detroit, Mich., assignor to Thompson Products, Inc., Cleveland, Ohio, a corporation of Ohio Application August 31, 1944, Serial No. 552,125

6 Claims. (Cl. 287—90)

This invention relates to joints equipped with roller bearings for facilitating rotative movements of the joint parts even when the same are subjected to high loads.

The invention specifically deals with tie rod joints having studs conveniently formed to finish dimensions by a grinding operation and rotatably supported in tiltable bearing rings on needle bearings and on roller bearings in angular relation to the needle bearings.

According to this invention, a tie rod end is provided with a socket or housing accommodating tilting movements of a bearing ring or seat member disposed in the housing. This seat member has a cylindrical bore therethrough together with a recessed end face. A cage of needle bearings is pressed into the cylindrical bore of the seat ring and a flat disk carrying roller bearings is seated in the recess of the seat ring. A stud having a cylindrical shank portion and a flat shoulder or flange portion has the cylindrical shank thereof rotatably mounted in the cage of needle bearings. The shoulder or flange of the stud rides on the rollers carried by the disk in the recessed end of the seat ring. A spring-urged member acts on the end of the stud to maintain the flange or shoulder in rolling engagement with the roller bearings and to maintain the seat ring in tilting relation with the socket or housing bearing wall.

The stud can be conveniently finished to desired dimensions on both the cylindrical shank portion and the shouldered or flange portion by a single grinding operation utilizing the periphery of a grindstone to finish the cylindrical shank portion and the side of the grindstone to finish the shoulder or flange portion. The studs of this invention are thus very cheaply made.

While the tie rod ends are the preferred form of joints according to this invention, it should be understood that the invention is not limited to such specific type of joints, since the principles of the invention are applicable to many other types of joint assemblies.

The needle bearings cooperate with the roller bearings to freely mount the stud in the seat ring for relative rotation. The needle bearings carry radial loads while the roller bearings carry thrust loads. The stud, when tilted, transmits its tilting movements to the seat member which tilts readily in the housing on plain bearing surfaces provided on the internal wall of the housing and on the external wall of the seat ring.

It is, then, an object of this invention to provide joints with separate sets of anti-friction bearings to carry thrust and radial loads while permitting free relative movements of the joint parts.

A still further object of the invention is to provide a tie rod end wherein a stud is rotatably mounted in a tiltable seat ring on roller bearings disposed in angular relationship to each other.

A further object of the invention is to provide a joint assembly with separate sets of anti-friction bearings to freely carry a loaded joint part.

Another object of the invention is to provide a tie rod end for steering assemblies of automotive vehicles and the like wherein a socket tiltably supports a seat ring equipped with roller bearings on an end face thereof and through an aperture therein, and wherein a flanged stud is rotatably mounted on said roller bearings.

A specific object of the invention is to provide a tie rod joint assembly of the anti-friction bearing type wherein thrust loads are carried on one set of anti-friction bearings and radial loads are carried on another set of anti-friction bearings.

Other and further objects of the invention will be apparent to those skilled in the art from the following detailed description of the annexed sheet of drawings which, by way of preferred example only, illustrates one embodiment of the invention.

On the drawing:

Figure 1 is an enlarged broken side elevational view with parts in vertical cross section, of a tie rod end according to this invention.

Figure 2 is a horizontal cross-sectional view through the stud, roller bearing, and seat ring of Figure 1, taken along the line II—II of Figure 1.

Figure 3 is a plan view of a plate of roller bearings used in the tie rod end assembly as shown in Figure 1.

Figure 4 is a fragmentary elevational view illustrating the manner in which the stud of the tie rod is finished on both bearing receiving surfaces thereof by a single grinding operation.

As shown on the drawing:

As best shown in Figure 1, the reference numeral 10 designates generally a housing or body member of a tie rod end. The body member 10 is composed of an enlarged socket portion 10a having a laterally extending externally threaded stem 10b. The stem 10b is adapted to be threaded into the end of a tie rod.

The socket portion or housing 10a provides a chamber C for receiving the joint parts. An internal segmental spherical bearing wall 10c is formed in one end of the chamber C and a cylindrical chamber wall 10d extends from the large end of the spherical wall 10c to a counterbored portion 10e at the other end of the housing. The counterbore 10e cooperates with the cylindrical wall 10d to provide therebetween a shoulder 10f.

A closure plate P closes the large open end of the chamber C and is seated in the counterbore 10e against the shoulder 10f. The closure plate P is secured in position by peening or spinning the end portion of the socket 10a over the marginal peripheral portion of the closure plate as at 10g.

A seat ring 11 is disposed in the chamber C and has a cylindrical aperture 11a therethrough together with a recess 11b at the bottom end thereof. The seat ring 11 has a segmental spherical outer wall 11c cooperating with the bearing wall 10c of the socket 10a. The bearing ring 11 can readily tilt on the socket wall 10c.

A cage 12 carrying needle bearings 13 is pressed into the aperture 11a of the seat ring 11 and has turned-over end portions 12a, 12a coacting with the pointed ends 13a, 13a of the needle bearings to retain these bearings in the aperture.

A flat disk plate 14 is seated in the recessed end 11b of the seat ring 11. The disk plate 14 has an inner peripheral wall 14a adapted to freely receive the cage 12 therein and has an outer peripheral edge 14b adapted to freely fit within the recess 11b.

The plate 14 has a plurality of slots 14c disposed radially therearound and these slots receive roller bearings 15. Peened portions 14d of the plate prevent displacement of the rollers 15 out of the slots, although the rollers are free to rotate in the slots.

A stud 16 is provided with a rounded button end portion 16a, an integral collar or flange portion 16b, a cylindrical shank portion 16c, a tapered shank portion 16d, and a reduced-diameter threaded end portion 16e. The cylindrical shank portion 16c of the stud extends through the cage of needle bearings and is rotatably supported on the needle bearings 13. The flange 16b has a top face engaging the rollers 15 carried by the plate disk 14.

A cup-shaped retainer member 17 is disposed in the chamber C and has an end wall 17a with a central segmental spherical depression 17b receiving the button end 16a of the stud in tiltable relation therein. The cup member 17 has a side wall or skirt 17c freely slidable in the chamber C. A coiled spring 18 is disposed in the cup 17 and held under compression between the closure plate P and the top wall 17a of the cup member to urge the cup member toward the stud and maintain the button end 16a of the stud and the socket portion 17b of the cup in seated relationship. This spring also causes the cup to urge the stud and the seating ring around the stud toward the converging end of the bearing wall 10c. This converging end of the bearing wall 10c terminates at a reduced opening 19 for the housing which opening, however, is of larger diameter than the shank portions of the stud so that the stud can freely tilt without striking the housing.

The spring maintains the top face of the flange 16b in thrusting relationship with the rollers 15 and these rollers 15 transmit thrust loads to the seat ring 11.

The press fit relationship between the cage 12 of the needle bearing and the seat ring 11, of course, maintains the needle bearings in the aperture of the seat ring. The needle bearings 13 carry radial loads.

The stud 16 is free to rotate in the seating ring 11 on the needle bearings 13 and roller bearings 15. The seat 11 is free to tilt on the bearing wall 10c of the housing. Thus, the tie rod end assembly includes a stud that is freely rotatable on anti-friction bearings disposed in angular relationship to each other, and is freely tiltable on plain bearings.

As illustrated in Figure 4, the cylindrical shank portion 16c and the top face of the stud flange 16b can be simultaneously finished by a single grinding operation on a simple grindstone 20. Thus the periphery 20a of the grindstone can finish the shank portion 16c while the side face 20b of the grindstone simultaneously finishes the top face of the flange 16b.

Since anti-friction bearings are provided for both axial and thrust loads on the stud, the stud will always freely rotate about its own axis, and steering resistance in the tie rod linkage is materially reduced.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A joint assembly comprising a housing having a bearing wall accommodating tilting movements, a seat member tiltable on said bearing wall having an aperture therethrough and an end face at one end of said aperture, a joint stud having a shank portion projecting through said aperture and a flange portion adjacent said end face of the seat member, needle bearings interposed between the seat member and shank portion of the stud, roller bearings interposed between the end face of the seat member and the flange portion of the stud, and a spring-urged retainer in said housing acting on said stud to maintain the joint parts in assembled relationship.

2. A tie rod end comprising a housing having a socket-defining portion and a stem projecting laterally therefrom, said socket-defining portion having an internal cylindrical wall extending inwardly from one end thereof and a converging wall accommodating tilting movements extending from the cylindrical wall to the other end of the housing and defining a reduced-diameter opening at said other end of the housing, a seat member in said chamber tiltable on said converging bearing wall, a stud member projecting freely through said reduced-diameter opening of the housing into said chamber and through said seat member, a closure for the end of the chamber opposite the reduced-diameter end thereof, a spring-urged member bottomed on said closure acting on said stud to urge the stud and seat ring toward the reduced-diameter opening of the housing, and separate sets of anti-friction bearings interposed between said seat ring and stud member and arranged to respectively carry thrust and radial loads encountered by the stud.

3. A joint assembly comprising a socket, a seat ring tiltable in said socket having an aperture therethrough and a recessed end face, a cage of needle bearings having the cage pressed into said aperture of the seat ring, a plate disk of roller bearings seated in said recessed end face of the seat ring, a stud having a cylindrical shank portion projecting through said cage of needle bearings in bearing engagement with the needle bearings together with a shoulder portion underlying the disk plate of roller bearings in engagement with the rollers, and spring means in said housing acting on said stud to maintain the joint parts in operative assembly.

4. A tie rod end assembly comprising a body member having a socket end portion and a stem portion extending laterally therefrom, said socket end portion defining a chamber with an enlarged open end and a bearing wall converging to a small open end opposite the enlarged open end, a closure plate secured in said large open end of the socket, a seat ring tiltable on said bearing wall and having a central aperture therethrough communicating with the small open end of the socket portion, a stud member having a cylindrical shank portion extending through said aperture of the seat ring and said small open end of the socket portion together with an outturned flange portion underlying the seat ring, anti-friction bearings interposed between the cylindrical portion of the stud and the periphery of the aperture of the seat ring, additional anti-friction bearings interposed between the flange portion of the stud and the end of the seat ring, said stud having a rounded end portion beneath said flange portion thereof, a retainer member having a depression receiving said rounded end portion of the stud in tiltable relation, and a spring bottomed on said closure plate acting on said retainer to urge the retainer against the rounded end portion of the stud and thereby maintain the joint parts in operative assembly.

5. A joint assembly comprising a housing, a seat ring tiltably mounted in said housing, said seat ring having a recessed end face and a cylindrical bore therethrough at an angle to said end face, a cage of needle bearings pressed in said bore of the seat ring and extending into said recessed end face, a plate of roller bearings in said recessed end face surrounding the extending end of the cage of needle bearings, a stud member having a shank portion rotatably mounted on said needle bearings and a flange portion rotatably mounted on the rollers of said plate bearings, and resilient means in said housing acting on said stud to maintain the bearing parts in operative assembly.

6. A joint assembly comprising a stud having a shank portion and an outturned flange at one end of the shank portion, a seat member having an external tilting surface, an end face and an aperture therethrough, antifriction bearings in said aperture of the seat member and disposed around the shank portion of the stud, additional antifriction bearings between said end face of the seat member and said outturned flange of the stud, a housing tiltably receiving said seat member, and a spring-urged member in said housing acting on said stud to maintain the parts in operative assembly.

JAMES H. BOOTH.